(No Model.)
F. G. JOHNSON.
CLOTHES SPRINKLER.
No. 380,039. Patented Mar. 27, 1888.
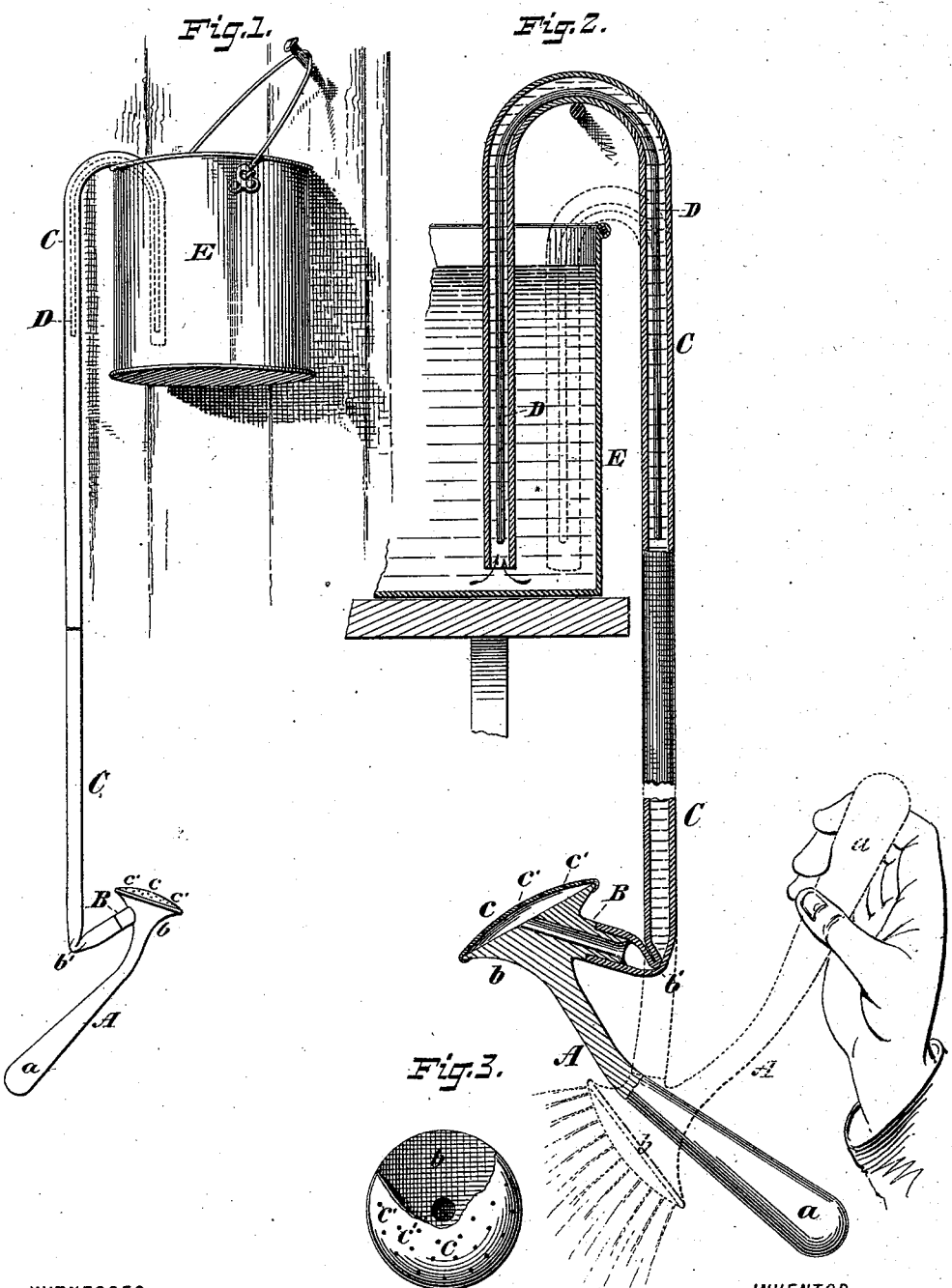
WITNESSES:
Gustave Dieterich
C. A. Dieterich
INVENTOR,
Frank G. Johnson

UNITED STATES PATENT OFFICE.

FRANK G. JOHNSON, OF NEW YORK, N. Y.

CLOTHES-SPRINKLER.

SPECIFICATION forming part of Letters Patent No. 380,039, dated March 27, 1888.

Application filed January 24, 1888. Serial No. 261,743. (No model.)

*To all whom it may concern:*

Be it known that I, FRANK G. JOHNSON, a citizen of the United States, residing in the city, county, and State of New York, have invented a new and useful Fountain Clothes-Sprinkler, of which the following is a specification.

The nature of my invention consists in employing a siphon-fountain or head of water running through a flexible tube arranged in such a manner that the flow of the water is controlled by the handle of the device.

The object of my invention is to provide a fine diverging spray of water from a rosette-sprinkler formed on the end of a handle, which handle is suspended to the flexible tube to enable the operator to send the spray in any desired direction, and to render such device convenient, simple, and inexpensive. I attain these objects by the peculiar arrangement illustrated in the accompanying drawings, in which—

Figure 1 is a general view with the device in position ready for use; Fig. 2, a sectional view showing the detail construction of the several parts. Fig. 3 shows the rosette formed on the end of the handle and the flexible water-pipe and their relation to each other.

Similar letters refer to similar parts throughout the several views.

A is a weighted handle, (of full size in Fig. 2 and weighted simply by its being made solid and of metal throughout its length from $a$ to $b$.)

B is a stem cast on the handle, having a hole extending through it to the front end of the handle A.

$c$ is a thin circular piece of metal oval in shape and soldered at its edge to the front end of the handle A, which leaves but a narrow yet sufficient chamber between it and the front end of the handle.

$c'$ $c'$ $c'$ are small openings or holes through the oval disk $c$, by which is formed the diverging spray of water.

C is a small flexible rubber tube, (full size in Fig. 2,) which is stretched on and secured to the stem B of the handle A.

D is a wire bent in the form of an inverted letter U, and placed within the flexible tube C to stiffen the tube at its upper end, so it can be hooked over and hang upon the edge of the pail E, which contains the supply of water, the pail itself being hooked upon a nail in the wall of the room or window-casing, as convenience may determine, or the pail may be suspended from a hook in the ceiling or placed on a shelf, as shown in Fig. 2.

$b'$ shows a short bend in the flexible tube, caused by the peculiar arrangement between the weighted handle A and the direction and position of the hollow stem B. It is the object of this peculiar arrangement to bend the tube at $b'$ in such a manner as to utilize the bend as a valve to cut off the flow of water at this point, which is done by allowing the weighted handle A to hang suspended by the tube. To assist in giving the proper bend to the tube at the point $b'$ and secure the water-tight compression of one side of the tube against the other, to act as a cut-off, the handle A is bent out of a straight line, as shown in the drawings.

Having described the several parts of my invention and their relation to each other, its operation is briefly explained as follows: The pail of water being suspended in any desired position, about three feet from the top of a table, the bent and stiffened portion of the tube C is hooked over the edge of the pail, so that the return end of the tube will come nearly to the bottom of the pail, as shown in Fig. 1. Then placing the rosette $c$ in the mouth and drawing the air out of the tube, it will be filled with water. Allowing the handle now to hang suspended by the tube, the sprinkler is ready for use and will remain so as long as any water remains in the pail. To now cause a fine diverging spray of water to issue from the handle, it is only necessary to grasp it (the handle A) and slightly elevate it, as shown by the hand and dotted lines in Fig. 2, and to throw the spray over a large surface it is only necessary to point the handle in any desired direction, and by slightly shaking it the finest drops of water are made to fall upon the garments to be sprinkled, thus rendering the most superior results. When a garment is sufficiently sprinkled and the operator desires to stop the flow of water to fold the article sprinkled, it is only necessary to let go of the handle, and by its own weight it will bend the tube at $b'$, and thus stop the flow of water so effectually and completely that not a drop will fall from the sprinkler after letting go of the handle.

What I claim as new, and desire to secure by Letters Patent, is—

1. In a clothes-sprinkler, the weighted handle A, having the hollow stem B and rosette-disk c, in combination with the flexible siphon-tube C, substantially in the manner and for the purpose set forth.

2. In a clothes-sprinkler, the weighted handle A, having the hollow stem B and rosette-disk c, in combination with the flexible siphon-tube C and stiffening-wire D, substantially as and for the purpose described.

FRANK G. JOHNSON.

Witnesses:
FRANK R. JOHNSON,
ROBERT C. DYKES.